April 19, 1960

H. NEUMANN 2,933,565

MAGNETIC TRANSDUCERS

Filed April 7, 1954

United States Patent Office 2,933,565
Patented Apr. 19, 1960

2,933,565

MAGNETIC TRANSDUCERS

Helmut Neumann, Karlsruhe, Germany, assignor to Siemens & Halske Aktiengesellschaft, Munich, Germany, a corporation of Germany Application April 7, 1954, Serial No. 421,521

Claims priority, application Germany April 15, 1953

13 Claims. (Cl. 179—100.2)

Figure 1:
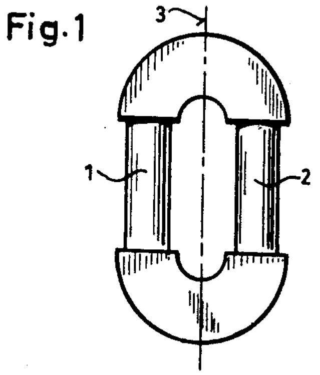

This invention is concerned with magnetic transducers comprising cores of sintered oxide ceramic ferromagnetic material known as ferrite. The term "transducer" is intended to include magnetic record and reproduce or pick-up heads and also erase heads.

The invention proposes to provide magnetic heads comprising cores made of sintered ferromagnetic material having certain properties which improve the quality and reliability of operation and which extend the range of operation.

The processing of oxide ceramic ferromagnetic cores produces difficulties due to the hardness and brittleness of the material. This is particularly true when it is desired to produce cores for magnetic heads having gaps on the order of 10 microns to 15 microns, thus averaging 12.5 microns. The material chips during grinding, milling or sawing to form the narrow gap, and previously made heads having ferromagnetic cores therefore exhibited gaps that were wider than desired, making the corresponding heads unfit for recording and reproducing or exhibiting a poorer quality than heads comprising laminated cores. The poor quality of prior magnetic heads was therefore in part due to the fact that the gaps did not exhibit the proper width, and high frequency operation accordingly suffered. All prior endeavors to produce extremely narrow gaps were unsuccessful.

Ferromagnetic cores present however considerable advantages. The material has as compared with laminated cores great resistance to wear, and the wear on the pole pieces by contact with the magnetic carrier, tape or the like, is accordingly considerably less than the wear on the pole pieces of laminated cores. The magnetic properties of ferromagnetic cores are not affected by the mechanical coaction with the magnetic carrier moving relative to the pole pieces thereof as is the case with laminated cores made of Mu metal. Laminated cores made of Mu metal strips are presumed to have a considerably higher permeability than most of the other ferromagnetic materials. However, the Mu metal is extraordinarily sensitive against mechanical alterations, its high permeability dropping rapidly, and it was accordingly impossible until now to fully utilize the high permeability values. The permeability of sintered ferromagnetic cores is lower than that of Mu metal laminated cores but it remains substantially unaffected by mechanical coaction with the tape, that is, it remains substantially constant.

The invention provides magnetic heads for high frequency operation comprising sintered ferromagnetic cores which are made of materials adapted to fully utilize the favorable mechanical and magnetic qualities of the high-grade core material.

This object is in part realized by the provision of magnetic heads comprising cores made of sintered manganese-zinc or nickel-zinc ferromagnetic material with a particle or grain size which is small as compared with the width of the gap. The gap may, for example, be on the order of about 10 microns to about 15 microns, averaging 12.5 microns, and the particle or grain size of the ferromagnetic material may be on the order of about 5 microns to about 10 microns, averaging 7.5 microns. The resulting magnetic head also exhibits favorable permeability, coersive force, Curie point and saturation.

Known magnetic record and reproduce heads are adapted for operation with signals up to about 15 kilocycles and fail completely at high frequencies. This is believed to be due not only to shortcomings of the magnetic carrier, tape or the like and to the customary tape speeds but also to shortcomings inherent in the known magnetic heads comprising laminated cores.

Another object of the invention is concerned with furnishing in this respect a decided improvement by the provision of magnetic record or reproduce heads comprising cores made of sintered manganese-zinc or nickel-zinc ferromagnetic material for operation with high frequency oscillations on the order of 100 kilocycles to 20 megacycles, for example, in the recording of television picture modulation oscillations of about 3–4 megacycles as well as synchronization impulses. For recording and reproducing of the high frequency oscillations, the corresponding magnetic heads are preferably used with a very rapidly moving tapelike magnetic carrier having an active coating of finely divided ferromagnetic material.

Sintered ferromagnetic materials may also be used for producing cores for magnetic erase heads providing for gaps about 0.2 millimeter wide. The available ferromagnetic materials differ considerably due to chemical composition and workability and especially so far as sintering times and sintering temperatures are concerned. Erase heads require cores with definite properties.

Prior erase heads with laminated cores, operated at about 60–100 kilocycles and relatively high frequency current are highly heated due to eddy current losses and hysteresis losses and the magnetic tape is thus affected mechanically and magnetically.

It is accordingly another object of the invention to provide an erase head comprising a sintered ferromagnetic core made of manganese-zinc material, exhibiting low eddy current and low hysteresis losses, that is, a loss factor $$\frac{tg\delta}{\mu}$$

due to permeability of the core material, on the order of $$\frac{tg\delta}{\mu}=\text{ca. } 8\cdot10^{-6} \text{ to } 20\cdot10^{-6}$$

at an erasing frequency of about 50 kilocycles to about 100 kilocycles. The coefficient of losses $tg\delta$ is the tangent of the angle of phase displacement of the current flowing in the coil so that the tangent of $\delta$ is in effect the reciprocal of the Q-factor of the core. The heating of the corresponding erase head is very considerably reduced. The resulting erase head also exhibits a favorable Curie point, a favorable relatively small coersive force, and a favorable permeability.

The invention proposes, in accordance with another object to improve magnetic heads and especially erase heads by the provision of coil means, disposed on the corresponding sintered ferromagnetic core comprising windings formed of high frequency cord or braid. The term "high frequency cord" is applied to a cord in which a plurality of mutually insulated wires are interlaced so that each individual wire appears similarly at each cross-sectional plane of the cord. The optimum number of wires in such cord depends upon the frequency and on the coil structure. The use of such cord or braid, in accordance with the considerations referred to, contributes toward reduction of the high frequency losses and therewith reduction of eddy current losses. The heating of the magnetic head is reduced avoiding damage thereto and detrimental effects on the magnetic properties of the core material.

Figure 3:
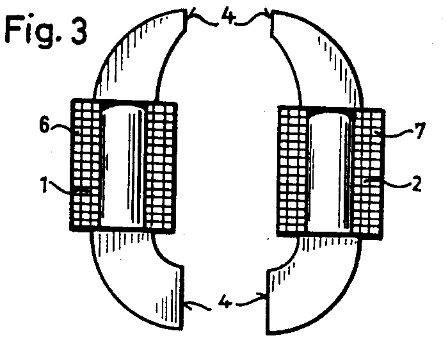
Figure 4:
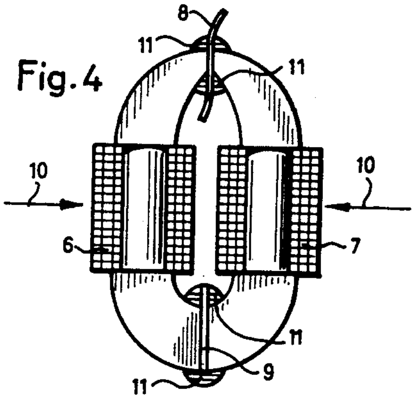
Figure 5:
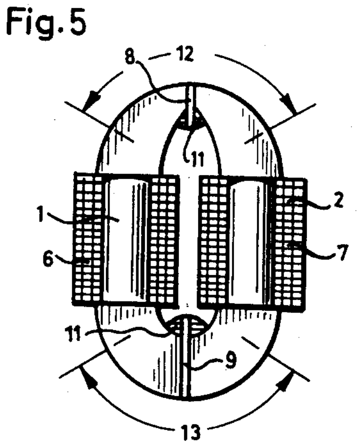
Figure 6:
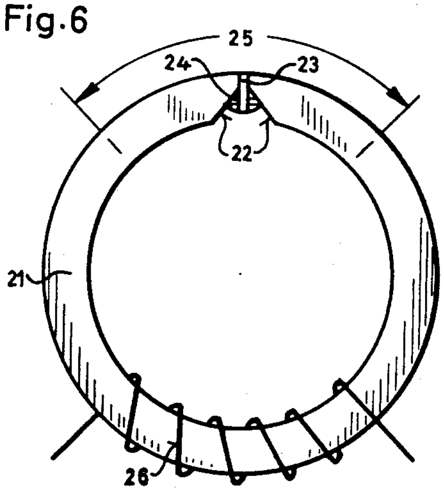

The invention will now be described with reference to the accompanying diagrammatic drawings showing examples of magnetic heads on enlarged scales. In these drawings, Figs. 1 to 4 show successive steps in making the new magnetic head;

Fig. 5 illustrates the magnetic head made by the successive steps of Figs. 1–4; and Fig. 6 indicates a magnetic erase head made in accordance with the invention.

The method of making magnetic heads as shown in the drawings has been described in copending application Ser. No. 416,673, filed March 16, 1954, but shall be described below for the sake of completion.

Referring now to the drawings, Fig. 1 indicates an elevational diagrammatic side view of an example of an oval-shaped sintered ferromagnetic core as it may be used for producing a magnetic head according to the invention. Ring-shaped or equivalently shaped cores can of course be used to equal advantage. The core is not exactly of ellipsoid shape but is provided with straight parallel limbs 1 and 2, which may be rounded, for receiving the required coils.

Figure 2:
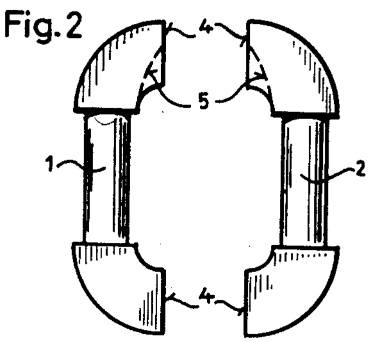

The core is in suitable manner and by suitable means severed along the median dot-dash line 3, for example, by cutting with a saw, to produce the two separate halves shown in Fig. 2.

It is of course not absolutely necessary to start with a core body such as indicated in Fig. 1; each of the two halves shown in Fig. 2 may, for example, be individually formed by suitable molding or pressing.

The surfaces 4 of the two pole pieces which will define the gap, are thereupon planed by suitable grinding, for example, by rubbing them against very fine emery paper placed upon a support, to make them plane and extending in parallel.

The next step requires, in accordance with the invention, suitable angular machining or forming to provide pointed or inclined or rounded ends extending generally along the lines 5 in Fig. 2.

The coils 6 and 7 are thereupon placed upon the straight limbs 1 and 2, respectively, to form the parts shown in Fig. 3.

The pole pieces of the two halves of Fig. 3 are thereupon suitably assembled to form the final core structure.

As illustrated in Fig. 4, a filler material 8 and 9 may be interposed between the faces of the inwardly facing ends of the core halves. Lateral pressure is suitably applied in the direction of the arrows 10. The inwardly facing ends of the two halves of the core are secured together, for example, by means of a suitable adhesive or cement 11. The upwardly disposed laterally inwardly facing ends of the core halves, as seen in the figures, form the magnetically effective pole pieces having a gap containing the filler 8. The joined lower ends containing the filler 9 absorb shearing stresses.

The gap filler material 8 and 9 is, for record or pick-up heads, preferably foil of plate-shaped and approximately 10 microns thick, its width corresponding to the width of the desired gap.

At least the gap filler material 8 is preferably of a hardness corresponding substantially to that of the sintered core and pole pieces, for example, molybdenum or tungsten or quartz or electrically and magnetically nonconductive material such as porcelain or the like. Similar material may be used for the filler 9, but its kind is not as critical because the corresponding gap merely serves for absorbing shearing stresses, having no coaction with the magnetic carrier. The corresponding gap therefore does not have to be of the quality of the other gap which is effective in the recording or the reproduce operation, respectively, for which the head may be used.

A self-hardening resinous material known in Germany as Aralditharz G may be used for the adhesive or cement 11.

The cement is permitted to solidify and the resulting structure is then ground along the outer surfaces comprising the gap fillers 8 and 9, at least within the regions indicated in Fig. 5 by the arrows 12 and 13. The grinding region along the arrow 12 corresponds to or forms the surface which is contacted by or coacts with the magnetic carrier, for example, the magnetic tape.

The interposed gap filler or foil 8 and if desired also 9 are from about 10 microns to about 15 microns thick.

The erase head shown in Fig. 6 comprises a sintered ring-shaped core 21 having pole pieces forming a gap about 0.2 millimeter wide. The gap may be formed by suitable sawing, milling, grinding or the like or in the pressing or molding process. The pole pieces are thereupon suitably machined to form the wedge-shaped cutout 22. Such cutout may of course be formed in the molding of the core body.

The gap formed by the pole pieces is filled with material 23 in foil or plate form, such material having a relatively low electric conductivity and a hardness corresponding substantially to that of the pole pieces. The filler material 23 projects into the wedge-shaped widened portion 22 and is secured by the adhesive or cement 24, which may be of the previously mentioned self-hardening resinous type. After the cement 24 has set, the surface of the pole pieces, which will coact with the magnetic carrier, tape or the like, is ground as before, for example, along an area indicated by the arrow 25, thus also correspondingly grinding the gap filler 23. Numeral 26 indicates the erase winding which is provided in known manner.

The gap filler is in each embodiment of a hardness which corresponds substantially to that of the corresponding sintered ferromagnetic pole pieces. Accordingly, after the final surface grinding along the areas 12 in Fig. 5 and 25 in Fig. 6, there will in each case result a uniform smooth arcuate continuous surface for magnetic coaction with the magnetic carrier or tape. If the gap filler were softer than the pole pieces, a groove would be formed at the gap; if harder material were used, it would form a ridge. The gap filler specified assures in each case the smooth arcuate active pole and gap surface.

All operations may be carried out by known means and in known manner. The respective structures may be embedded in a suitable molding mass contained in a suitably shaped cup or the like.

As has been said before, the invention proposes to produce magnetic heads such as illustrated in the drawings, comprising cores made of sintered ferromagnetic material having certain favorable properties which improve the quality and the reliability and which extend the range of the operation thereof.

The corresponding material known as ferrite, has a crystalline structure and the particle or grain size is determined by the size of the crystals. The crystal size again depends on the chemical composition and the production method of the material, and especially on the time of sintering and on the sintering temperature.

In accordance with one object of the invention, the relationships existing between the composition of the material and the working or processing applied thereto are such as to produce cores having particles of extremely small size. The particle size determines the accuracy of the pole piece surfaces which define the very narrow gap which averages for record and reproduce heads about 12.5 microns. It is in accordance with the invention possible to provide considerably narrower gaps with material having small particle or grain size than would be possible with coarse grained material. The corresponding choice of the material therefore makes it possible to fully utilize the favorable properties of the ceramic ferromagnetic materials for magnetic heads and to provide very considerable improvements as to the quality thereof, especially at the highest audible frequencies.

The grain or particle size of the ceramic material is in a certain relationship with the permeability value. As a disadvantage may be mentioned the fact that ferrite material with small grain size exhibits low permeability and that high permeability values can be obtained only with material of large grain size. The invention recognizes that it is not always advisable to reduce the grain size to extreme values. It is possible to provide narrower gaps with material of progressively smaller grain or particle size but the permeability drops accordingly.

The invention therefore proposes to apply in the choice of the ferrite material a compromise between grain size and permeability, such, that the core exhibits a grain size which is as small as possible, on the order of 5 microns to 10 microns, averaging 7.5 microns, while the resulting core has a permeability on the order of about 2000.

In addition to grain size and permeability, the invention also considers in the choice and use of the ferrite material the coersive force by providing cores having small grains averaging about 7.5 microns, exhibiting a permeability of about 2000 and having a relatively small coersive force of about 100 millioersteds.

This small coersive force furnishes considerable advantages with respect to the magnetization of the corresponding magnetic heads by directional magnetic fields. The cores of prior magnetic heads, especially laminated cores made of Mu metal are magnetized by directional magnetic fields of the power source and the magnetic ground field or the like and it is therefore necessary that they are periodically demagnetized. This drawback is wholly eliminated by the use of sintered cores having in accordance with the invention the small coersive force on the order as noted above.

The ferrite material for the cores is also chosen considering the Curie point. In accordance with the invention, the Curie point lies relatively high at about 100° to about 115° C. The favorable magnetic properties are usually lost above the Curie temperature. The Curie point is of importance because magnetic heads are frequently heated in the operation thereof. In accordance with the invention, the heating of a magnetic head can in no case occur up to the Curie point lying at about 100° to about 115° C.

The saturation of the ferrite material used lies according to the invention at a value on the order of about 2000 gausses.

The conditions indicated above are in accordance with the invention satisfied by using for the core of the magnetic heads ceramic sintered ferromagnetic material made of nickel-zinc ferrite. It is of advantage to make the cores of nickel-zinc ferrite which is cultured in accordance with the above explained conditions.

It will be recalled that known magnetic sound apparatus is suitable for recording signals of a frequency at the most up to about 15 kilocycles and that they fail completely at higher frequencies. Magnetic heads having cores made of oxide ceramic sintered material of the type of ferrite, for example, made of nickel-zinc ferrite or of manganese-zinc ferrite provide a decided improvement for the recording of high frequency oscillations on the order of about 100 kilocycles to about 20 megacycles, for example, in the recording of television modulation oscillations of about 3–4 megacycles and in the recording of synchronizing impulses. The resulting magnetic heads are preferably operated with unusually rapidly moving tape.

The sintered cores exhibit particularly small high frequency losses up to frequencies on the order of about 20 megacycles. This accounts for the fact that these cores can handle television frequencies and the like free of loss and to record such frequencies upon magnetic carriers.

The mechanical wear on the very hard core material is very small at the high tape speeds which may exceed 10 meters per second and the magnetic properties of the cores are not affected thereby as would be the case with laminated Mu cores.

It is thus possible to provide magnetic heads with very high permeability values and to provide corresponding coil windings. A head for recording higher frequencies is advantageously provided with a coil comprising high frequency cord or braid of the previously defined kind. Such winding contributes toward further improvement with respect to the high frequency losses.

The grain size of the sintered core is as previously stated small, on the order of about 5 microns to about 10 microns, averaging 7.5 microns because the high frequency operation requires very narrow gaps averaging about 12.5 microns. The size of the grain determines the proper forming of the pole pieces to provide the gap surfaces having defined edges. Only the use of small grain material makes it possible to form very narrow operatively effectively gaps.

The sintering conditions and the composition of the core material are provided in accordance with the grain size.

Several of the above described conditions also apply in the case of erase heads, an example of which is shown in Fig. 6, having gaps on the order of about 0.2 millimeter.

Not all of the known oxide ceramic ferromagnetic ferrite materials are suitable for cores for erase heads. The material found particularly suitable for the cores of erase heads is manganese-zinc ferrite also used for cores for record and reproduce heads as described before.

Erase heads provided with such cores make it possible for the first time to use strong high frequency erase current of about 60–100 kilocycles to effect a considerably improved effective erasure of the magnetic records on tapes and the like.

The oxide ceramic ferromagnetic core of the erase head according to the invention exhibits low hysteresis losses on the order of $$\frac{tg\delta}{\mu} = \text{about } 8\cdot 10^{-6} \text{ to about } 20\cdot 10^{-6}$$

at an erase frequency of about 50–100 kilocycles. The heating which occurs with erase heads having laminated cores due to eddy current losses and hysteresis losses is very considerably reduced.

The advantages resulting from the favorable wear properties of the oxide ceramic core material are also fully present in erase heads made in accordance with the invention. It is accordingly unecessary to exchange the coresponding heads or the pole pieces thereof due to wear after a certain operating period.

Erase heads having cores according to the invention also avoid the previously described disadvantages of heads having laminated cores made of high permeability Mu metal or the like which are with regard to magnetic properties considerably affected by mechanical wear as well as by heating.

The previously indicated advantages resulting from the use of the sintered ceramic oxide ferromagnetic cores having a high Curie point on the order of 100–115° C. are fully present in the new erase heads. As has been explained before, the favorable properties of the ferrite material are generally lost above the Curie point. The provision of a high Curie point therefore permits raising of the operating temperature of erase heads without altering the properties thereof. The high frequency erase current can accordingly be raised.

The material used for the cores of erase heads should have a small coersive force, as in the record and reproduce heads described before. A small coersive force on the order of about 250 millioersteds has been found satisfactory.

The advantage of the small coercive force in erase heads corresponds to that already described with record and reproduce heads, namely, the heads are not magnetized by magnetic directional fields of the power source or of the earth magnetic field or the like. The magnetic carrier, tape or the like, is accordingly not premagnetized by a direct current component. Previously known erase heads having laminated cores had to be periodically demagnetized. This disadvantage is completely avoided.

The permeability of the core material for the new erase heads should be on the order of about 700.

The electric and magnetic losses are particularly important in the case of erase heads because they may cause excessive heating which may damage the magnetic carrier as well as the core material. As described before, such excessive heating is avoided by the use of cores made of the sintered ferromagnetic material.

The invention recognizes in addition that high frequency losses may also be caused in the coil winding of the erase head.

The invention accordingly proposes to improve magnetic heads and especially erase heads by the provision of a coil having windings made of high frequency cord as previously defined and as mentioned before in connection with record and reproduce heads for high frequency operation.

What is believed new and desired to have protected by Letters Patent is defined in the appended claims.

I claim:

1. A magnetic transducer for high-frequency oscillations comprising a core made of oxide ceramic sintered material selected from the class of materials consisting of nickel-zinc and manganese-zinc ferromagnetic materials, said core forming pole pieces defining a gap having an average width of about 12.5 microns, the average grain size of the oxide ceramic material of said core being about 7.5 microns.

2. A transducer as defined in claim 1, wherein said core material has a permeability of about 2000.

3. A transducer as defined in claim 1, wherein said core material has a coercive force of about 100 millioersteds.

4. A transducer as defined in claim 1, wherein the Curie point of said core is on the order of about 100 to a maximum of about 115° C.

5. A transducer as defined in claim 1, wherein the saturation of said core is on the order of about 2200 gausses.

6. A transducer as defined in claim 1, wherein said core material has a permeability of about 2000 with a coercive force of about 100 millioersteds and a Curie point from about 100° C. to about 115° C. and the saturation thereof being on the order of about 2200 gausses.

7. A transducer as defined in claim 6, having an energizing coil carried by said core, the windings of said coil being formed of a cord comprising a plurality of mutually insulated wires which are interlaced so that each individual wire appears in similar place at each cross-sectional plane of the cord.

8. A magnetic transducer comprising a core of oxide ceramic material selected from the class of materials consisting of nickel-zinc and manganese-zinc materials, said core forming a very narrow gap, the grain size of said material being small as compared with the width of said gap, the hysteresis losses and eddy current losses of said core being at operating frequencies in the range of about 50–100 kilocycles on the order of $$\frac{tg\delta}{\mu} = \text{about } 8\cdot 10^{-6} \text{ to about } 20\cdot 10^{-6}$$

wherein $$\frac{tg\delta}{\mu}$$

is the loss factor due to permeability of the core material.

9. A transducer as defined in claim 8, wherein the Curie point of said core is on the order of about 100 to a maximum of about 115° C.

10. A transducer as defined in claim 8, wherein the coercive force of said core is on the order of 250 millioersteds.

11. A transducer as defined in claim 8, wherein the permeability of said core is on the order of about 700.

12. A transducer as defined in claim 8, wherein the Curie point of said core is on the order of about 100° C. to a maximum of about 115° C. with a coercive force on the order of 250 millioersteds and a permeability of about 700.

13. A magnetic transducer according to claim 12 comprising an energizing coil having windings made of a cord comprising a plurality of mutually insulated wires which are interlaced so that each individual wire appears in similar place at each cross-sectional plane of the cord.

References Cited in the file of this patent

UNITED STATES PATENTS

| | | |
|---|---|---|
| 2,711,945 | Kornei | June 28, 1955 |
| 2,809,237 | Bergmann | Oct. 8, 1957 |